United States Patent
Andrea Tallada et al.

(10) Patent No.: US 9,710,737 B2
(45) Date of Patent: Jul. 18, 2017

(54) PRINTING IMAGES WITH VARIED GLOSS LEVELS USING PRETREATMENT FLUID

(71) Applicant: Hewlett-Packard Development Company, L.P., Houston, TX (US)

(72) Inventors: Alex Andrea Tallada, Barcelona (ES); Luis Garcia, Les Roquetes (ES)

(73) Assignee: HEWLETT-PACKARD DEVELOPMENT COMPANY, L.P., Houston, TX (US)

(*) Notice: Subject to any disclaimer, the term of this patent is extended or adjusted under 35 U.S.C. 154(b) by 0 days.

(21) Appl. No.: 15/101,348

(22) PCT Filed: Dec. 5, 2013

(86) PCT No.: PCT/US2013/073345
§ 371 (c)(1),
(2) Date: Jun. 2, 2016

(87) PCT Pub. No.: WO2015/084373
PCT Pub. Date: Jun. 11, 2015

(65) Prior Publication Data
US 2016/0342866 A1    Nov. 24, 2016

(51) Int. Cl.
*G06K 15/02* (2006.01)
*G06F 3/12* (2006.01)
*G06K 15/10* (2006.01)
*B41J 11/00* (2006.01)
*H04N 1/60* (2006.01)

(52) U.S. Cl.
CPC ......... *G06K 15/188* (2013.01); *B41J 11/0015* (2013.01); *G06F 3/1208* (2013.01); *G06F 3/1244* (2013.01); *G06F 3/1288* (2013.01); *G06K 15/102* (2013.01); *G06K 15/1868* (2013.01); *H04N 1/605* (2013.01); *G06K 2215/0082* (2013.01); *H04N 2201/0094* (2013.01)

(58) Field of Classification Search
CPC ............... G06K 15/188; G06K 15/102; G06K 15/1868; B41J 11/0015; G06F 3/1208; H04N 1/605
See application file for complete search history.

(56) References Cited

U.S. PATENT DOCUMENTS

| | | |
|---|---|---|
| 6,438,336 B1 | 8/2002 | Bengtson |
| 7,997,714 B2 | 8/2011 | Ma et al. |
| 8,465,118 B2 | 6/2013 | Emamjomeh et al. |

(Continued)

FOREIGN PATENT DOCUMENTS

| | | |
|---|---|---|
| JP | 2007065459 | 3/2007 |
| WO | WO-2013050080 | 4/2013 |

OTHER PUBLICATIONS

Kiddell, P., "Understanding and Using Pad Printing Inks," 2013; http://www.epsvt.com/support/generalIssue.cfm?issID=17.

*Primary Examiner* — Christopher D Wait
(74) *Attorney, Agent, or Firm* — HP Inc.—Patent Department (57) ABSTRACT

In one example of the disclosure, a first area of an image to be printed at a first gloss level is identified. A second area of the image to be printed at a lesser second gloss level is identified. Printing of the image is caused in a gloss-varying printmode that applies a pretreatment fluid to a media where the second area is to be printed, and not where the first area is to be printed, and applies a colorant or colorants to the media where the first and second areas are to be printed.

15 Claims, 6 Drawing Sheets

(56) References Cited

U.S. PATENT DOCUMENTS

| | | |
|---|---|---|
| 2009/0165934 A1 | 7/2009 | Koike |
| 2011/0304661 A1 | 12/2011 | Emamjomeii et al. |
| 2012/0139984 A1 | 6/2012 | Lang |
| 2013/0044157 A1 | 2/2013 | Sarkisian et al. |
| 2013/0061767 A1 | 3/2013 | Casals et al. |

PRINTING IMAGES WITH VARIED GLOSS LEVELS USING PRETREATMENT FLUID

CROSS-REFERENCE TO RELATED APPLICATION

This application is a U.S. National Stage Application of and claims priority to International Patent Application No. PCT/US2013/073345, filed on Dec. 5, 2013, and entitled "PRINTING IMAGES WITH VARIED GLOSS LEVELS USING PRETREATMENT FLUID," which is hereby incorporated by reference in its entirety.

BACKGROUND

Modern printing technologies have enabled digital print businesses to enter a variety of markets beyond the printing of books, magazines, and card stock. Commercial and industrial digital print businesses may provide image-printing services to create commercial packaging, banners, decorations, home wallpapers, skins for electronic devices, apparel and other products. Such digital print businesses seek the ability to provide to customers, at high volumes, a high quality product at a low cost.

DETAILED DESCRIPTION

Introduction:

In today's commercial and industrial printing market, digital print businesses seek abilities to create unique and stunning effects to attract new customers and generate additional sales. One of these features that allows a device or manufacturer differentiate from its competitors is the ability to print selective areas of an image with higher or lower level of gloss, providing attractive effects in the final printouts that are highly valued by customers.

Digital print businesses have typically accomplished causing gloss variances by utilizing printers with dedicated printhead channels to expel a varnish overcoat. The varnish overcoat enhances the gloss level of colorants previously placed one the media. The dedicated printhead channels are channels in addition to the printhead channels used to expel a colorant or colorants onto a media. Vaned-gloss printing according to this traditional process has a drawback, though, in that this technique can require that the printer possess extra production assets to accomplish the gloss-variance (e.g. varnish for the overcoat, and dedicated printhead channels to eject the varnish) that increase the cost per print. Further, in many applications the use of a varnish overcoat after application of colorants will require a heating or curing process to set the varnish such that creates the intended gloss effect.

To address these issues, various embodiments described in more detail below provide for a system and a method to enable printing of images with varied gloss levels using a pretreatment fluid that is accessible to the printer for functionality aside from variable gloss printing, in an example of the disclosure, print data with instructions for printing an image is obtained. Responsive to determining the image is to be printed with varying gloss levels, a first image area to be printed at a first gloss level is determined, and a second image area to be printed at a lesser second gloss level is determined. The image is caused to be printed using a gloss-varying printmode wherein pretreatment fluid is caused to be applied to a media where the second area is to be printed at a first speed, without application of pretreatment fluid where the first area is to be printed. Also pursuant to the gloss-varying printmode, the colorants are caused to be applied, at the first speed, to the media where the first and second areas are to be printed. Responsive to determining the image is not to be printed with varying gloss levels, the image is caused to be printed using a bleed-reduction printmode wherein the pretreatment fluid is caused to be applied, at a second printing speed faster than the first speed, to the media where the colorants are to be applied, and wherein the colorants are caused to be applied to the media, at the second speed, to form the image.

In this manner, embodiments of this disclosure present an automated and efficient manner to print images in a vaned gloss level printmode at a first print speed using a pretreatment fluid, wherein the pretreatment fluid is also usable to print the image in an another printmode, at a faster printing speed, at which the pretreatment fluid is to be applied to the media without regard to gloss levels, and the colorants are applied to form the image, such that the pretreatment reduces or eliminates colorant bleed or coalescence between colorants or colorant bleed to an unintended area of a media. The disclosed system and method can use the same source of pretreatment fluid, in different printmodes, to create different gloss levels in printed images, or to optimize quality by minimizing colorant bleed or coalescence.

Using the new varied gloss printmode that is slow enough to make the use of pretreatment not so critical, it also is possible to print areas of the image that are to be glossy without application of the pretreatment fluid and to thereby reduce the amount of pretreatment needed as compared to other printmodes. The disclosed method of varied gloss printing using pretreatment fluid does not require additional equipment (e.g., extra printhead channels) over the equipment and print channels already available in printers that use pretreatment fluid for bleed/coalescence prevention. Accordingly, users will benefit from savings in money and in space. And as the disclosed method and system for varied gloss printing do not require a heating, UV, or other finishing process after application of the colorants, users will also experience savings in operation time. Such advantages of the disclosure will cause customer satisfaction with digital printing, and the printers and other the computing devices that facilitate the digital printing, to increase.

The following description is broken into sections. The first, labeled "Environment," describes an environment in which various embodiments may be implemented. The second section, labeled "Components," describes examples of various physical and logical components for implementing various embodiments. The third section, labeled as "Operation," describes steps taken to implement various embodiments.

Figure 1:
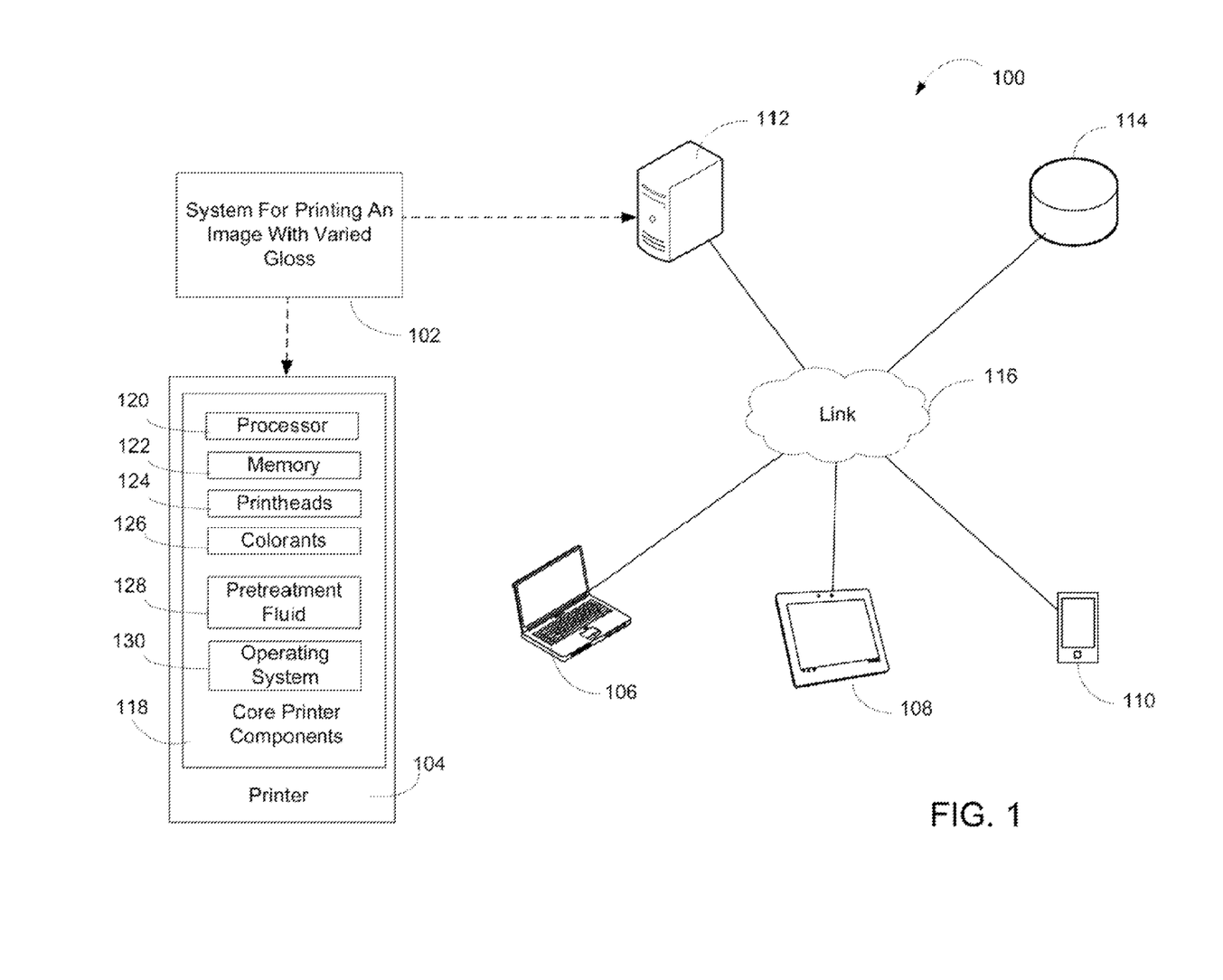
FIG. 1 is a block diagram depicting an example environment in which various embodiments may be implemented.

Environment:

FIG. 1 depicts an example environment 100 in which embodiments may be implemented as system 102 for printing images with varied gloss levels using pretreatment fluid. Environment 100 is show to include printer 104, client devices 106, 108, and 110, server device 112, and a data store 114. Components 104-114 are interconnected via link 116.

Link 116 represents generally any infrastructure or combination of infrastructures configured to enable an electronic connection, wireless connection, or other connection to enable data communication between components 104-114. Such infrastructure or infrastructures may include, but are not limited to, one or more of a cable, wireless, fiber optic, or remote connections via telecommunication link, an infrared link, or a radio frequency link. For example, link 116 may represent the Internet, one or more intranets, and any intermediate routers, switches, and other interfaces. As used herein an "electronic connection" refers generally to a transfer of data between components, e.g., between two computing devices, that are connected by an electrical conductor. A "wireless connection" refers generally to a transfer of data between two components, e.g., between two computing devices, that are not directly connected by an electrical conductor. A wireless connection may be via a wireless communication protocol or wireless standard for exchanging data.

Printer 104 represents generally a device or combination of electronic devices configured to produce a physical printed representation of an image. Printer 104 may be a multifunction device that can perform a function such as scanning and/or copying in addition to printing. In the example environment of FIG. 1, printer 104 may be a color inkjet printer located in a printing system located in a commercial printing facility. In other examples printer 104 may be a printer located in a home. In examples printer 104 may be thermal inkjet printer, a piezoelectric inkjet printer, a latex ink printer, a solid ink printer, or any other type of printer that ejects a liquid or semi-liquid colorant or colorants to form an image.

Printer 104 is shown to include core printer components 118. Core printer components 118 represent generally the hardware and programming for providing printing and computing functions for which printer 104 is designed. Such hardware and programming can include a processor 120 and memory 122, one or more printheads 124, stored or accessible colorants 126, and stored or accessible pretreatment fluid 128. The hardware and programming can include an operating system 130 to cause the printer to interpret print data, and cause printer 104 to eject colorant and pretreatment fluid through printheads 124, according to mapping provided by print data, to form an image upon a media. As used herein, an "image" refers generally to a rendering of an object, scene, person, or abstraction such text or a geometric shape.

A "printhead" refers generally to a mechanism having a plurality of nozzles through which a colorant, colorants, pretreatment fluid, or other fluid is ejected. Examples of printheads are drop on demand inkjet printheads, such as piezoelectric printheads and thermo resistive printheads. Some printheads may be part of a cartridge which also stores the fluid to be dispensed. Other printheads are standalone and are supplied with fluid by an off-axis fluid supply. In an example, printheads 124 may include at least one pretreatment printhead that is a channel dedicated for a printer 104 to expel pretreatment fluid 128, and at least one colorant printhead that is a channel dedicated for expelling a single colorant 126 to form images. In another example, printheads 124 may include at least one pretreatment printhead that is a channel dedicated for a printer 104 to expel pretreatment fluid 128, and at least one colorant printhead that is a channel dedicated for expelling multiple colorants 126 to form images.

"Colorant" refers generally to any fluid used for printing that includes a pigment, including but not limited to aqueous inks, solvent inks, UV-curable inks, dye sublimation inks and latex inks. "Pigment" refers generally to a coloring matter, including, but not limited to insoluble powders, to be mixed with water, oil, or another base to produce an ink or other fluid. In examples a colorant may be, but it is not limited to, a black colorant with a black pigment, a cyan colorant with a cyan pigment, a magenta colorant with a magenta pigment, or a yellow colorant with a yellow pigment. "Pretreatment fluid" refers generally to any fluid that is available to a printer to be applied to a media to eliminate, reduce, or discourage colorant bleeding or coalescence of colorants. As used herein, colorant "bleed" or "coalescence" refers generally to a colorant, after application to a media, seeping into another colorant or into an area of the media in a manner not prescribed by print data for the image. Typically a pretreatment fluid contains no pigment, or an insignificant amount of pigment such that the pretreatment fluid will not be visible by itself to the human eye.

In an example, printer 104 may additionally include a display apparatus to exhibit or present a message, image, view, or other presentation for perception by a user, and can include, but is not limited to, a visual, tactile or auditory display. In examples, the display apparatus may be or include a monitor, a touchscreen, a projection device, a touch/sensory display device, or a speaker. In example, printer 104 may include a user interface to enable interaction between a user and printer 104 such that the user may effect operation or control of user printer 104. In examples user interface may be, or include, a keyboard, mouse, keypad, or a mouse. In some examples, the functionality of a display apparatus and user interface may be combined, as in the case of a touchscreen apparatus that may enable presentation of images at printer 104, and that also may enable a user to operate or control functionality of printer 104.

Server device 112 represents generally any computing device configured to serve an application and corresponding data for consumption by printer 104 and client devices 106-110. Client devices 106-110 represent generally any computing device configured to send data to, and receive data from, printer 104 and server device 112 via link 116 such that a user may interact with the client device to communicate with printer 104 and server device. Data store 114 represents any device or collection of devices for storing data that can be accessed by printer 104, server 112, and/or client devices 106-110. Data store 114 may be integrated into one or more of printer 104, client devices 106-110, and server 112. Stored data can include print data with instructions for printing an image at printer 104. Stored data may include a digital representation of the image.

System 102, discussed in more detail below, represents generally a combination of hardware and programming configured to enable printing of images with varied gloss levels using pretreatment fluid. Briefly, system 102 is configured to identify a first area of an image to be printed at a first gloss level, and a second area of the image to be printed at a lesser second gloss level. System 102 is to cause printing of the image in a gloss-varying printmode, at a first printing speed. As used herein, a "printmode" or printing "mode" refers to a method, way, or manner of operation as printing of an image is accomplished. Examples of other printmodes include, but are not limited to draft, duplex, photo, color, grayscale, and black-ink-only printing. A "printing speed" refers generally to any means of measurement of speed with which a printing operation is conducted. In an example, a methodology for measuring printing speed does not include or measure processing time, which may vary depending upon the computer configuration, image, software, and connectivity. In another example, a test of printing speed may be according to a methodology that does include or measure processing time. In examples, the test methodology may require consistent print variables such as draft mode (e.g. plain paper text versus photo, single-side printing versus duplex printing), test conditions (e.g., test environment, other connected computing devices, network), and image type and size). In example, a methodology for measuring printing speed may measure a speed at which pretreatment and a colorant or colorants are applied to a media to form an image, without regard to other printing process tasks such as media input, media output, or collating, in another example, a methodology for measuring printing speed may measure a printing speed according to a time elapsed between the delivery of one media page at a printer output tray, and delivery of a second media page at the output tray.

In the gloss-varying printmode, a printer 104 is caused to apply a pretreatment fluid 128 to a media where the second area is to be printed, but not where the first area is to be printed. The pretreatment fluid is applied at a first printing speed. In the gloss-varying printing mode, the printer 104 is caused to apply colorants 126 to the media, also at the first printing speed. The printer 104 is, as an alternative to the gloss-varying mode, operable to print the image in a bleed-prevention mode to apply the pretreatment fluid 128 to a media where the first and second areas are to be printed and apply the colorants 126 to the media. In the bleed-prevention mode the pretreatment fluid 128 and the colorants 126 are applied at a second speed that is greater than the first speed. In an example, the first printing speed and second printing speeds are printing speeds determined according to a same print speed measurement methodology.

System 102 may be wholly integrated within core printer components 118 at printer 104. System 102 may be implemented as a component of server device 112 where it takes action based in part on data received from core printer components 118 via link 116. System 102 may be distributed across printer 104 and server device 112. For example, identifying a first area of an image to be printed at a first gloss level, and a second area of the image to be printed at a lesser second gloss level, may be performed on server device 112, while causing printing of the image in the gloss-varying mode at the first printing speed or the bleed-reduction mode at the second printing speed may be performed on printer 104. Other distributions of system 102 across printer 104 and server device 112 are possible and contemplated by this disclosure. It is noted that portions of the system for printing images with varied gloss levels using pretreatment fluid 128 may also be included on client devices 106, 108 or 110.

Figure 2A:
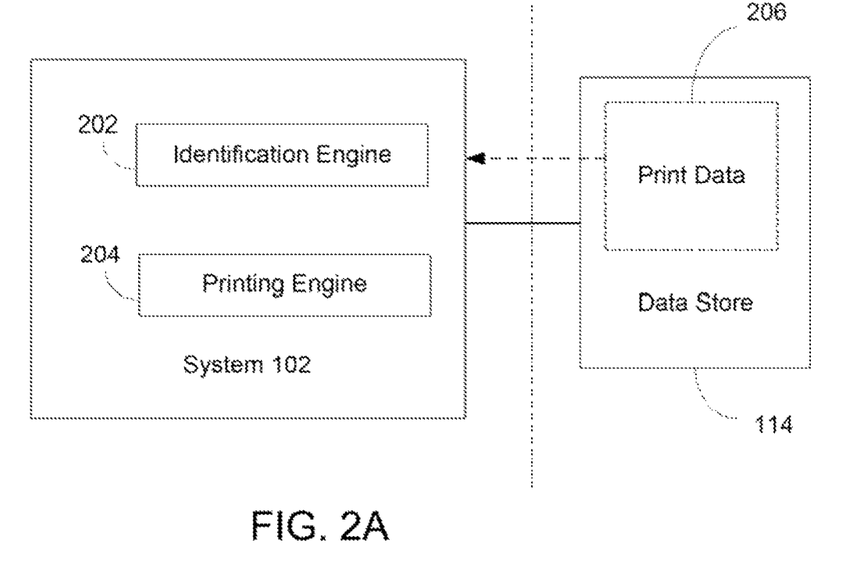
FIG. 2A is a block diagram depicting an example of a system to print images with varied gloss levels using pretreatment fluid.
Figures 3A, 3B:
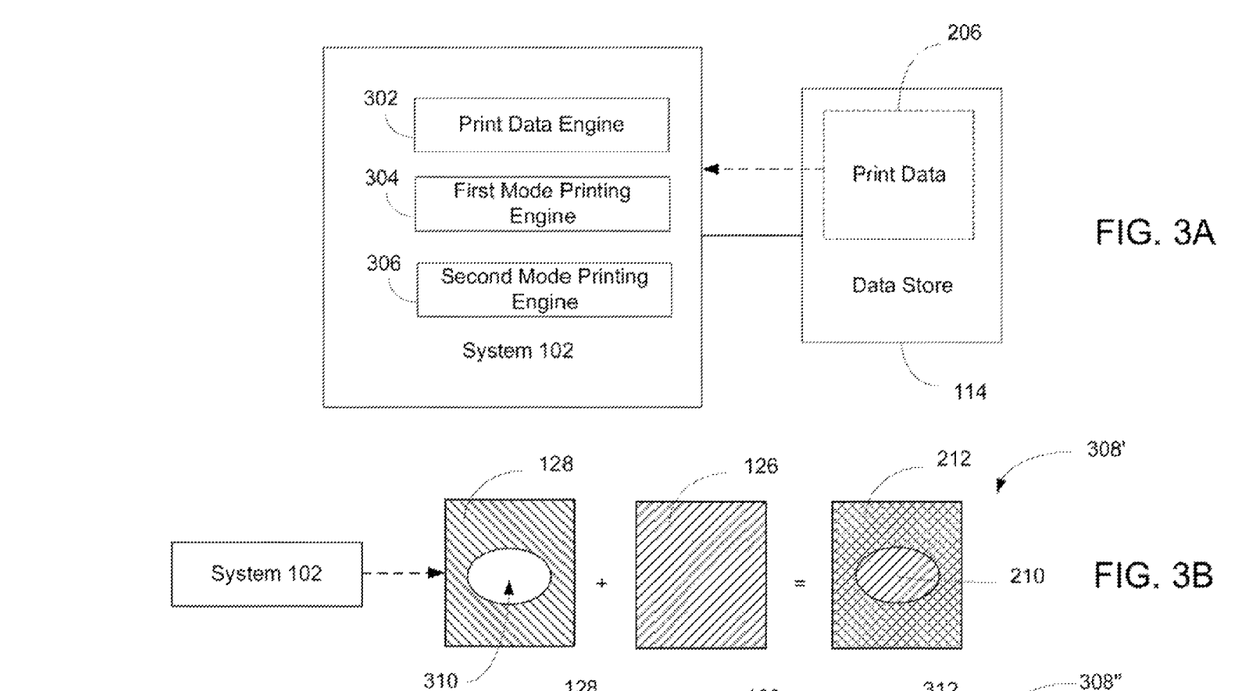
FIG. 3A is a block diagram depicting another example of a system to print images with varied gloss levels using pretreatment fluid.
FIG. 3B illustrates an example of printing an image with pretreatment ink in a gloss-varying printmode.

Components:

FIGS. 2A, 3A, 4A, and 4B depict examples of physical and logical components for implementing various embodiments. In FIG. 2A various components are identified as engines 202, 204. In FIG. 3A various components are identified as engines 302, 304, 306. In describing engines 202, 204, 302, 304, 306, focus is on each engine's designated function. However, the term engine, as used herein, refers generally to a combination of hardware and programming configured to perform a designated function. As is illustrated later with respect to FIGS. 4A and 4B, the hardware of each engine, for example, may include one or both of a processor and a memory, while the programming may be code stored on that memory and executable by the processor to perform the designated function.

FIG. 2A is a block diagram depicting components of system for printing images with varied gloss levels using pretreatment fluid 128. In this example, system 102 includes identification engine 202 and printing engine 204. In performing their respective functions, engines 202, 204, may access data store 114. Data store 114 represents generally any memory accessible to system 102 that can be used to store and retrieve data.

Figure 2B:
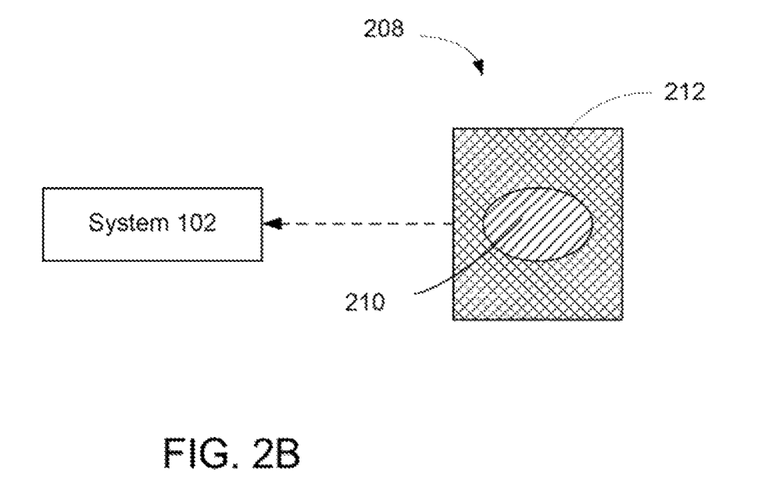
FIG. 2B illustrates an example of identification a first area of an image to be printed at a first gloss level, and a second area of the image to be printed at a lesser second gloss level.

Identification engine 202 represents a combination of hardware and programming configured to identify a first area of an image to be printed at a first gloss level, and a second area of the image to be printed at a lesser second gloss level. In an example the identification engine 202 may retrieve, receive, or otherwise obtain print data 206 from the data store 114, and then analyze the print data 206 to identify the first and second areas of the image to be printed. FIG. 26, in view of FIG. 2A, provides an example of the image to be printed at the varied gloss levels, according to the print data 206. In this example the identification engine 202 may interpret the obtained print data 206 to identify a first area 210 of an image 208 to be printed at the first gloss level, and the second area 212 of the image 208 to be printed at the lesser second gloss level. In an example, the print data 206 may be in a PDF, JPEG, TIFF, PSD, Raw, PostScript, Encapsulated Postscript, or other image file format. In an example the identification engine 202 may identify the first 210 and second 212 areas by interpreting metadata embedded within such an image file. In another example, the print data 206 may be a hash function data structure includes instructions for printing an image 208 the first 210 and second areas 212.

In a particular example, the first area 210 with the first gloss level and the second area 212 with the second, lesser, gloss level are gloss-level areas of image 208 that were identified by a user. In an example, the first 210 and second 212 areas were identified by a user via user interaction with a software application that enables a user to designate areas of an image for printing with varied gloss levels. In a particular example, the software application may be an image-editing software application that enables a user to interact with a display of the image to printed (e.g. via a touchpad or other user interface), and to mark or otherwise designate within the displayed image first 210 and second 212 areas of the image to be printed with varied gloss levels. In another example, the software application may be a printer driver. In a particular example, the software application may be a printer driver or other application accessible at a client device 106-110, that enables a user at the client device to instruct a printer 104 to print the image 208 with the varied gloss levels. As used herein, a "printer driver" refers to software or programming that when executed at a computing device enables communication between a printer and the device, and/or converts image print data or other data to be printed to a format understandable to the printer.

Returning to FIG. 2A, printing engine 204 represents a combination of hardware and programming configured to cause printing of the image in a gloss-varying printmode. In the glossy-varying printmode, the printer is caused to apply a pretreatment fluid at a first printing speed to a media where the second area 212 is to be printed, and not where the first area 210 is to be printed. In the gloss-varying printmode, the printer is caused to apply colorants to the media at a first printing speed in the first and second print areas 210 212. The printer is, as alternative to the gloss-varying mode, additionally operable in a bleed-prevention mode to, at a second speed greater than the first speed, print the image by applying the pretreatment fluid to a media where the first and second areas 210 212 are to be printed, and then applying the colorants to the media in the first and second areas 210 212. In an example, in bleed-prevention mode printing the pretreatment fluid is applied to the media in all areas the colorants are to be applied.

FIG. 3A is another block diagram depicting components of a system for printing images with varied gloss levels using pretreatment fluid 128. In this example, system 102 includes print data engine 302, first mode printing engine 304, and second mode printing engine 306. In performing their respective functions, engines 302, 304, 306 may access data store 114. Print data engine 302 represents a combination of hardware and programming configured to retrieve, receive, or otherwise obtain print data 206, including instructions for printing an image, from the data store 114.

First mode printing engine 304 represents a combination of hardware and programming configured to analyze or interpret the print data 206, and responsive to determining from the print data 206 that the image 308' (FIG. 3B) is to be printed with varying gloss levels, determines a first area 210 (FIG. 3B) of an image 208 to be printed at a first gloss level, and a second area 212 (FIG. 3B) of the image 208 to be printed at a lesser second gloss level. Moving to FIG. 3B in view of FIG. 3A, first mode printing engine 304 causes pretreatment fluid 128 to be applied to a media, at a first printing speed, where the second area 212 is to be printed at a first speed, without 310 applying any pretreatment fluid 128 to the media where the first area 210 of the image is to be printed. First printing mode engine 304 causes colorants to be applied, at the first printing speed, to the media in the first 210 and second areas 212. In an example, first mode printing engine 304 causes the pretreatment fluid 128 to be applied to the media prior to the application of the colorants 126 to the media.

Figure 3C:
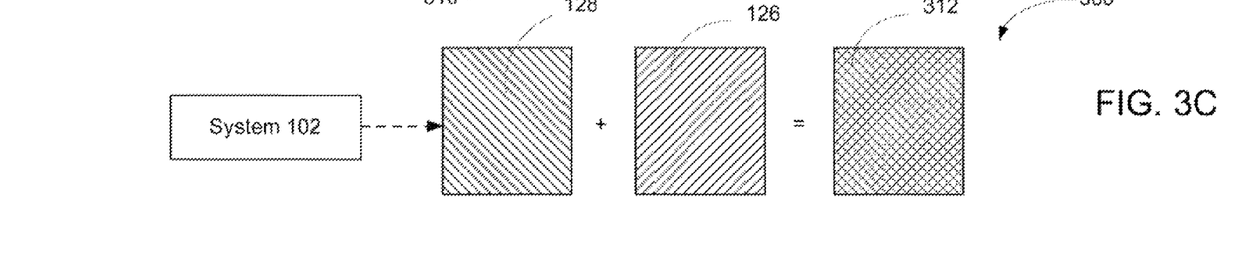
FIG. 3C illustrates an example of printing an image with pretreatment ink in a bleed-reduction printmode.

Returning to FIG. 3A, second mode printing engine 306 represents a combination of hardware and programming configured to, responsive to determining from the print data 206 that the image 308" (FIG. 3C) to be printed is not to be printed with varying gloss levels, causes pretreatment fluid 128 to be applied to a media in areas where colorants 126 are to be applied to the media to form the image 308". Moving to FIG. 3C in view of FIG. 3A, second mode printing engine 306 applies the pretreatment fluid 128 at a second speed that is faster than the first speed utilized when the printing is caused by the first mode printing engine 304. Second mode printing engine 306 then applies the colorants 126 to form the image 308". This second mode application of pretreatment fluid 128 to the media, followed by application of the colorants 126 in the same areas 312 that pretreatment fluid 128 was applied, is a bleed-reduction mode that functions to reduce or eliminate colorant bleed or coalescence of the colorants during this faster second speed printing. In this example, the first and second printing speeds are speeds measured utilizing a same print speed measurement methodology.

In an example of system 102 and first and second mode printing engines 304 306, the first printing speed that is utilized while the first mode printing engine 304 effects varied-gloss printing is a speed that approximately 50% slower than the second printing speed that is utilized while the second mode printing engine 306 effects bleed-reduction or coalescence-reduction printing. In another example of system 102 and first and second mode printing engines 304 306, the first printing speed utilized by a printer 104 while the first mode printing engine 304 effects varied-gloss printing is a speed that is at least 50% slower than the second printing speed that the printer 104 utilizes when the second mode printing engine 306 effects bleed-reduction or coalescence-reduction printing.

In an embodiment, the difference between the first and second printing speeds may be attributable to one or more printheads 124 making additional passes in the vaned-gloss printmode as compared to the number of printhead passes to be made when printing in the bleed-reduction printmode. In another embodiment, the difference between the first and second printing speeds may be attributable to a reduction in carriage speed in the varied-gloss printmode as compared to the carriage speed when printing in the bleed-reduction printmode. In another embodiment, the difference between the first and second printing speeds may be attributable to a programmed delay between swaths during varied-gloss printmode printing as compared to a shorter delay between swaths when printing in the bleed-reduction printmode.

In the foregoing discussion of FIGS. 2A and 3A, engines 202, 204, 302, 304, 306 were described as combinations of hardware and programming. Engines 202, 204, 302, 304, 306 may be implemented in a number of fashions. Looking at FIGS. 4A and 4B the programming may be processor executable instructions stored on a tangible memory resource 402 and the hardware may include a processing resource 404 for executing those instructions. Thus memory resource 402 can be said to store program instructions that when executed by processing resource 404 implement system 102 of FIGS. 1, 2A, and 3A.

Memory resource 402 represents generally any number of memory components capable of storing instructions that can be executed by processing resource 404. Memory resource 402 is non-transitory in the sense that it does not encompass a transitory signal but instead is made up of more or more memory components configured to store the relevant instructions. Memory resource 402 may be implemented in a single device or distributed across devices. Likewise, processing resource 404 represents any number of processors capable of executing instructions stored by memory resource 402. Processing resource 404 may be integrated in a single device or distributed across devices. Further, memory resource 402 may be fully or partially integrated in the same device as processing resource 404, or it may be separate but accessible to that device and processing resource 404.

In one example, the program instructions can be part of an installation package that when installed can be executed by processing resource 404 to implement system 102. In this case, memory resource 402 may be a portable medium such as a CD, DVD, or flash drive or a memory maintained by a server from which the installation package can be downloaded and installed. In another example, the program instructions may be part of an application or applications already installed. Here, memory resource 402 can include integrated memory such as a hard drive, solid state drive, or the like.

Figure 4A:
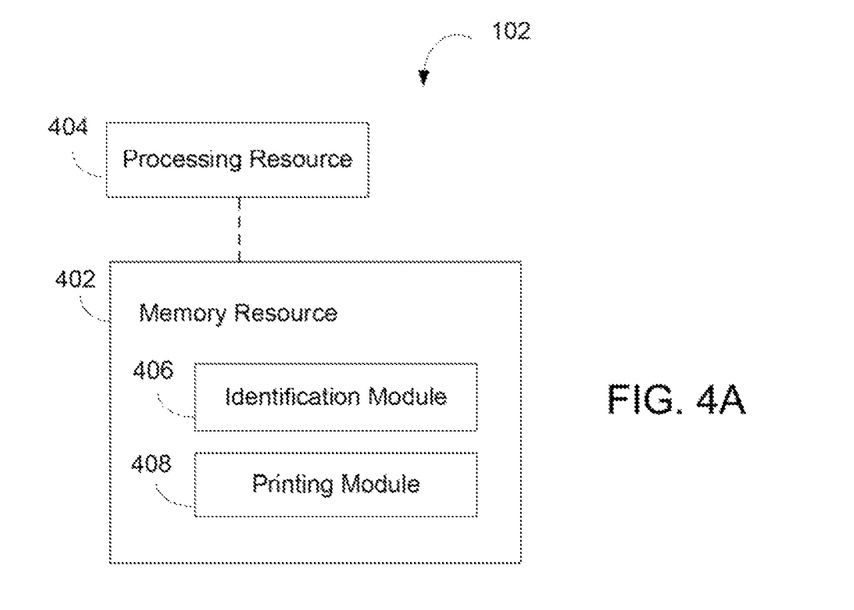
FIG. 4A is a block diagram depicting a memory resource and a processing resource according to an example.

In FIG. 4A, the executable program instructions stored in memory resource 402 are depicted as identification module 406 and printing module 408 Identification module 406 represents program instructions that when executed may cause processing resource 404 to cause the implementation of identification engine 202 of FIG. 2A. Printing module 408 represents program instructions that when executed cause processing resource 404 to cause the implementation of printing engine 204 of FIG. 2A.

Figure 4B:
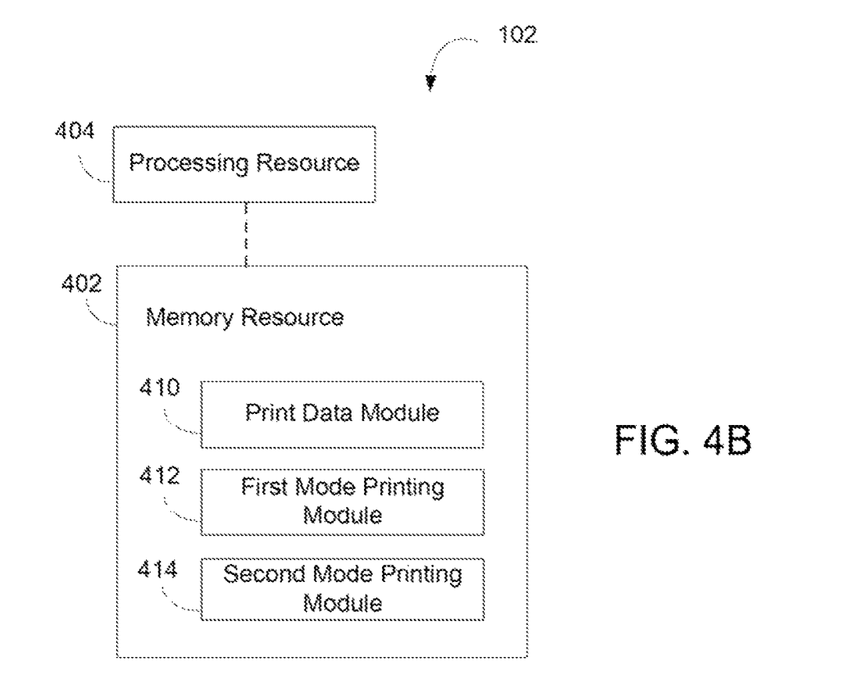
FIG. 4B is another block diagram depicting a memory resource and a processing resource according to an example.

In FIG. 4B, the executable program instructions stored in memory resource 402 are depicted as print data module 410, first mode printing module 412, and second mode printing module 414. Print data module 410 represents program instructions that when executed may cause processing resource 404 to cause the implementation of print data engine 302 of FIG. 3A. First mode printing module 412 represents program instructions that when executed may cause processing resource 404 to cause the implementation of first mode printing engine 304 of FIG. 3A. Second mode printing module 412 represents program instructions that when executed cause processing resource 404 to cause the implementation of second mode printing engine 306 of FIG. 3A.

Figure 5:
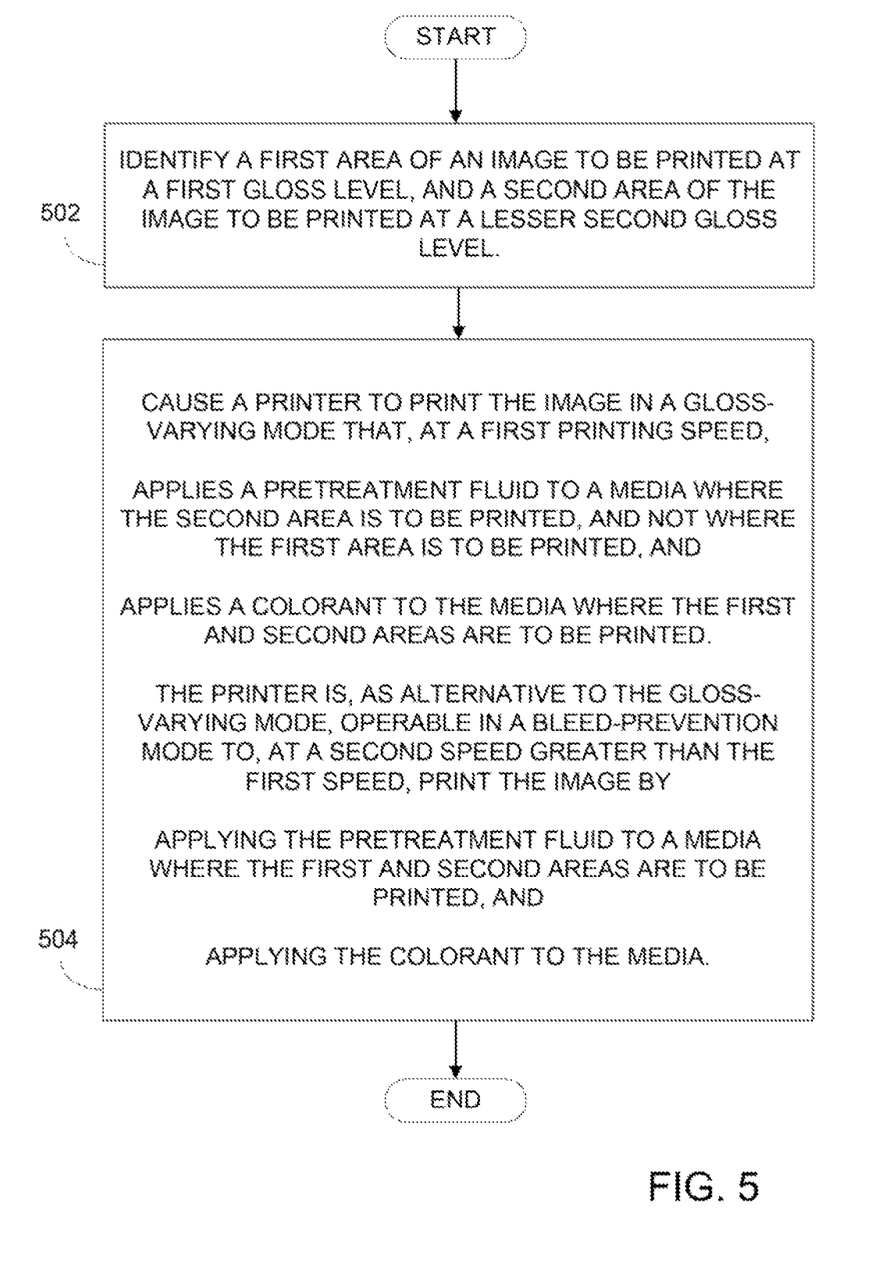
FIG. 5 is a flow diagram depicting steps taken to implement an example.

Operation:

FIG. 5 is a flow diagram of steps taken to implement a method for printing images with varied gloss levels using pretreatment fluid. In discussing FIG. 5, reference may be made to the components depicted in FIGS. 2A and 4A. Such reference is made to provide contextual examples and not to limit the manner in which the method depicted by FIG. 5 may be implemented. A first area of an image to be printed at a first gloss level, and a second area of the image to be printed at a lesser second gloss level, are identified, (block 502). Referring back to FIGS. 2A and 4A, identification engine 202 (FIG. 2A) or identification module 406 (FIG. 4A), when executed by processing resource 404, may be responsible for implementing block 502.

A printer is caused to print the image in a gloss-varying mode that, at a first printing speed, applies a pretreatment fluid to a media where the second area is to be printed, and does apply pretreatment fluid where the first area is to be printed. Pursuant to the gloss-varying printmode the printer is caused to apply a colorant to the media where the first and second areas are to be printed. The printer is, as alternative to the gloss-varying mode, operable in a bleed-prevention mode to, at a second speed greater than the first speed, print the image by applying the pretreatment fluid to a media where the first and second areas are to be printed, and applying the colorant to the media (block 504). Referring back to FIGS. 2A and 4A, printing engine 204 (FIG. 2A) or printing module 408 (FIG. 4A), when executed by processing resource 404, may be responsible for implementing block 504.

Figure 6:
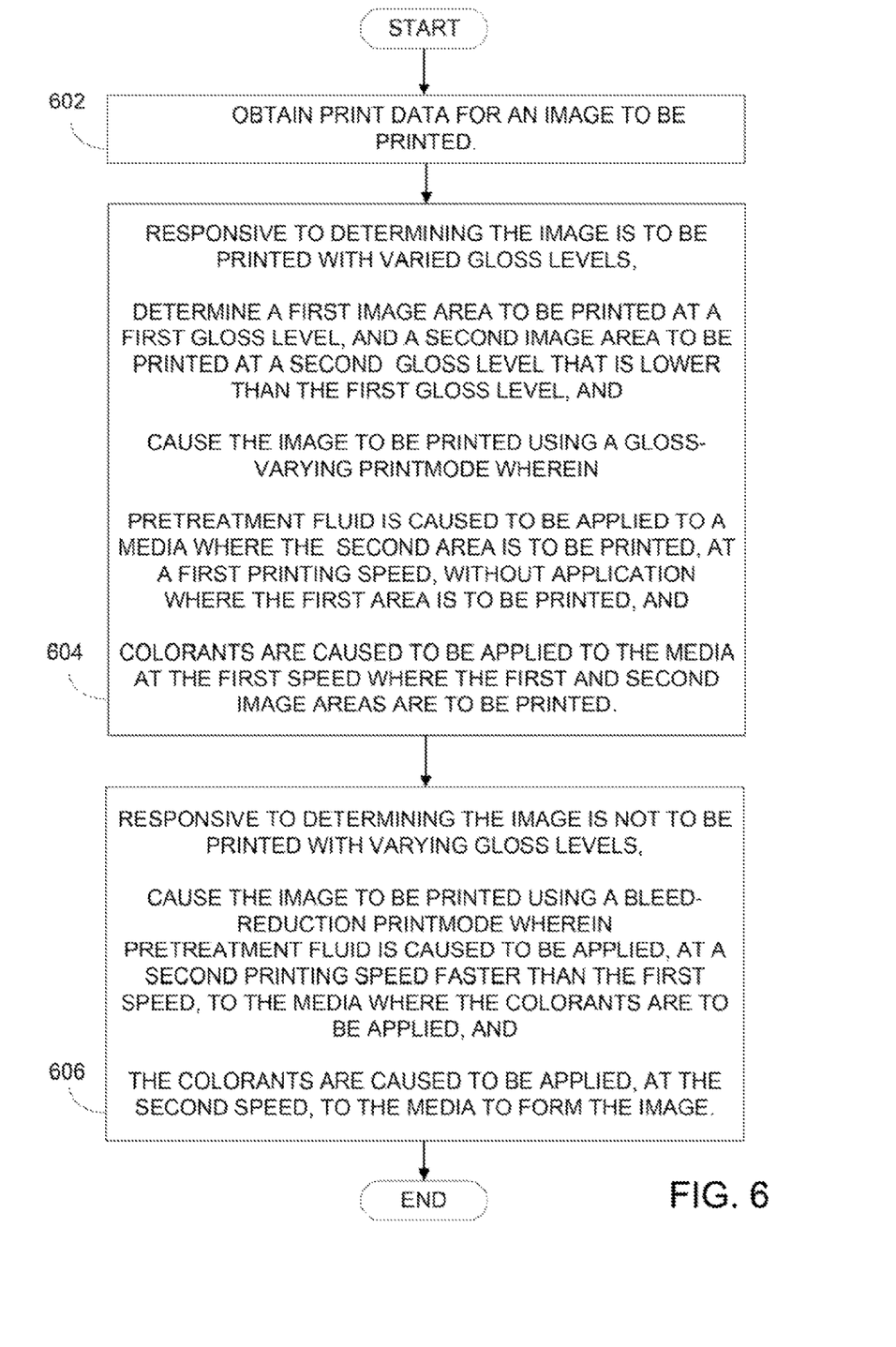
FIG. 6 is another flow diagram depicting steps taken to implement an example.

FIG. 6 is a flow diagram of steps taken to implement a method for printing images with varied gloss levels using pretreatment fluid. In discussing FIG. 6, reference may be made to the components depicted in FIGS. 3A and 4B. Such reference is made to provide contextual examples and not to limit the manner in which the method depicted by FIG. 6 may be implemented.

Print data for an image to be printed is obtained (block 602). Referring back to FIGS. 3A and 4B, print data engine 302 (FIG. 3A) or print data module 410 (FIG. 4B), when executed by processing resource 404, may be responsible for implementing block 602.

Responsive to determining the image is to be printed with varied gloss levels, a first image area to be printed at a first gloss level is determined and a second image area to be printed at a second gloss level that is lower than the first gloss level is determined. The image is caused to be printed using a gloss-varying printmode wherein pretreatment fluid is caused to be applied to a media where the second area is to be printed, at a first printing speed, and wherein the pretreatment fluid is not applied to the media where the first area is to be printed. Pursuant to the gloss-varying printmode, colorants are caused to be applied to the media at the first speed where the first and second image areas are to be printed (block 604). Referring back to FIGS. 3A, and 4B, first mode printing engine 304 (FIG. 3A) or first mode printing module 412 (FIG. 4B), when executed by processing resource 404, may be responsible for implementing block 602.

Responsive to determining the image is not to be printed with varying gloss levels, the image is caused to be printed using a bleed-reduction printmode. Pursuant to the bleed-reduction printmode pretreatment fluid is caused to be applied, at a second printing speed faster than the first speed, to the media where the colorants are to be applied, and the colorants are caused to be applied, at the second speed, to the media to form the image (block 606). Referring back to FIGS. 3A, and 4B, second mode printing engine 306 (FIG. 3A) or second mode printing module 414 (FIG. 4B), when executed by processing resource 404, may be responsible for implementing block 602.

CONCLUSION

FIGS. 1-7 aid in depicting the architecture, functionality, and operation of various embodiments. In particular, FIGS. 1-48 depict various physical and logical components. Various components are defined at least in part as programs or programming. Each such component, portion thereof, or various combinations thereof may represent in whole or in part a module, segment, or portion of code that comprises one or more executable instructions to implement any specified logical function(s). Each component or various combinations thereof may represent a circuit or a number of interconnected circuits to implement the specified logical function(s). Embodiments can be realized in any memory resource for use by or in connection with processing resource. A "processing resource" is an instruction execution system such as a computer/processor based system or ASIC (Application Specific Integrated Circuit) or other system that can fetch or obtain instructions and data from computer-readable media and execute the instructions contained therein. A "memory resource" is any non-transitory storage media that can contain, store, or maintain programs and data for use by or in connection with the instruction execution system. The term "non-transitory" is used only to clarify that the term media, as used herein, does not encompass a signal. Thus, the memory resource can comprise any one of many physical media such as, for example, electronic, magnetic, optical, electromagnetic, or semiconductor media. More specific examples of suitable computer-readable media include, but are not limited to, hard drives, solid state drives, random access memory (RAM), read-only memory (ROM), erasable programmable read-only memory, flash drives, and portable compact discs.

Although the flow diagrams of FIGS. 5 and 6 show specific orders of execution, the orders of execution may differ from that which is depicted. For example, the order of execution of two or more blocks or arrows may be scrambled relative to the order shown. Also, two or more blocks shown in succession may be executed concurrently or with partial concurrence. All such variations are within the scope of the present invention.

The present invention has been shown and described with reference to the foregoing exemplary embodiments. It is to be understood, however, that other forms, details and embodiments may be made without departing from the spirit and scope of the invention that is defined in the following claims.

What is claimed is:

1. A system to print an image with varying gloss levels, comprising:
   an identification engine, to identify a first area of an image to be printed at a first gloss level, and a second area of the image to be printed at a lesser second gloss level;
   a printing engine, to cause a printer to print the image in a gloss-varying mode that, at a first printing speed,
      applies a pretreatment fluid to a media where the second area is to be printed, and not where the first area is to be printed; and
      applies a colorant to the media where the first and second are to be printed;
   wherein the printer is, as alternative to the gloss-varying mode, operable in a bleed-prevention mode to, at a second speed greater than the first speed, print the image by
      applying the pretreatment fluid to a media where the first and second areas are to be printed; and
      applying the colorant to the media.

2. The system of claim 1, wherein the first and second areas are determined by interpreting obtained print data.

3. The system of claim 1, wherein the first and second areas are areas identified by a user.

4. The system of claim 1, wherein in the bleed-prevention mode the pretreatment fluid is applied to the media in all areas the colorant is to be applied.

5. The system of claim 1, wherein the first and second areas were identified via a software application that enables user-designation of variable image gloss levels.

6. The system of claim 5, wherein the application is an image-editing application.

7. The system of claim 5, wherein the application is a printer driver.

8. The system of claim 1, wherein in the gloss-varying printmode the colorant is applied to the media following application of the pretreatment fluid.

9. The system of claim 1, wherein the first speed is approximately 50% slower than the second speed.

10. A memory resource storing instructions that when executed cause a processing resource to implement a system the instructions comprising:
   a print data module, to receive data for printing an image;
   a first mode printing module to, responsive to determining the image is to be printed with varying gloss levels,
      determine a first image area to be printed at a first gloss level, and a second image area to be printed at a lesser second gloss level;
      cause pretreatment fluid to be applied to a media where the second area is to be printed at a first speed, without application where the first area is to be printed;
      cause application of colorants at the first speed to the media where the first and second areas are to be printed; and
   a second mode printing module to, responsive to determining the image is not to be printed with varying gloss levels,
      cause pretreatment fluid to be applied, at a second speed faster than the first speed, to the media where colorants are to be applied, in order to reduce or eliminate colorant bleed, and
      cause the colorants to be applied to the media, at the second speed, to form the image.

11. The memory resource of claim 10, wherein first print speed and the second print speed are speeds determined using a same print speed measurement methodology.

12. The memory resource of claim 10, wherein the first speed is at least 50% slower than the second speed.

13. The memory resource of claim 10, wherein the first mode printing module includes instructions to cause the system to apply the colorants to the media following application of the pretreatment fluid.

14. The memory resource of claim 10, wherein the colorants to be applied to the media are latex ink colorants.

15. A method to print an image with varied gloss levels, comprising:
   obtaining print data for an image to be printed;
   responsive to determining the image is to be printed with varied gloss levels,
      determining a first image area to be printed at a first gloss level, and a second image area to be printed at a second gloss level that is lower than the first gloss level;
      causing the image to be printed using a gloss-varying printmode wherein
         pretreatment fluid is caused to be applied to a media where the second area is to be printed, at a first printing speed, without application where the first area is to be printed;
         colorants are caused to be applied to the media at the first speed where the first and second image areas are to be printed; and
   responsive to determining the image is not to be printed with varying gloss levels, causing the image to be printed using a bleed-reduction printmode wherein
      pretreatment fluid is caused to be applied, at a second printing speed faster than the first speed, to the media where the colorants are to be applied, and
      the colorants are caused to be applied, at the second speed, to the media to form the image.

* * * * *

UNITED STATES PATENT AND TRADEMARK OFFICE
CERTIFICATE OF CORRECTION

PATENT NO. : 9,710,737 B2
APPLICATION NO. : 15/101348
DATED : July 18, 2017
INVENTOR(S) : Alex Andrea Tallada et al.

It is certified that error appears in the above-identified patent and that said Letters Patent is hereby corrected as shown below:

In the Claims

In Column 11, Line 27, in Claim 1, delete "second are" and insert -- second areas are --, therefor.

In Column 11, Line 55, in Claim 10, delete "system" and insert -- system, --, therefor.

Signed and Sealed this
Twenty-sixth Day of December, 2017

Joseph Matal
*Performing the Functions and Duties of the*
*Under Secretary of Commerce for Intellectual Property and*
*Director of the United States Patent and Trademark Office*